United States Patent [19]

Cheng

[11] Patent Number: 4,803,585
[45] Date of Patent: Feb. 7, 1989

[54] TAPE RECORDER STOP MECHANISM
[75] Inventor: H. T. Cheng, Taipei, Taiwan
[73] Assignee: Lisonic Electronic Co. Ltd., Taipei, Taiwan
[21] Appl. No.: 15,146
[22] Filed: Feb. 17, 1987
[51] Int. Cl.$^4$ .................. G11B 15/22; G11B 21/14
[52] U.S. Cl. ................... 360/96.3; 360/96.4; 360/105; 360/137
[58] Field of Search .............. 360/137, 96.3, 105, 360/96.4

[56] References Cited
U.S. PATENT DOCUMENTS

| | | | |
|---|---|---|---|
| 4,408,237 | 10/1983 | Takahashi et al. | 360/96.3 |
| 4,581,665 | 4/1986 | Ito et al. | 360/96.3 |
| 4,623,946 | 11/1986 | Ida | 360/96.3 |

Primary Examiner—Robert S. Tupper
Attorney, Agent, or Firm—Morton J. Rosenberg

[57] ABSTRACT

The improvement of a tape recorder mechanism which comprises a push-back angle plate located at the leading end of swivel arm, an intermediate gear installed on the swivel arm and engaged to the winding gear, a knock-back slider installed between the operation lever and main deck, and a rewind slider installed on the secondary deck. The swivel arm is linked with a transmission mechanism by a split spring which provides means for the advancing and returning movement of both parts. When the tape winding operation is stopped, the overwinding of a short piece of tape during stop operation is avoided automatically by simply pressing down the stop operation lever. The first step of pressing down the stop operation lever to move the lever mechanism a small distance ahead, enables the push-back angle plate on the swivel arm and the knock-back slider, pushing the pinch roller bracket and swivel arm simultaneously, therefore the intermediate gear is disengaged from the driven gear and the pinch roller is separated from main guide shaft. Continue pressing down of the stop operation lever to further advance the displacement of the lever mechanism, the forward operation mode of magnetic head is released and the forward play mode is tripped out. The aforementioned process can stop motion simultaneously when the stop operation lever is depressed. Thus the overwinding of a short piece of tape can be avoided.

1 Claim, 3 Drawing Sheets

TAPE RECORDER STOP MECHANISM

BACKGROUND OF THE INVENTION

As for the conventioned cassette player, when the stop operation lever is depressed, a short piece of tape may continues its forward movement, which may cause losing a message on telephone answering system or language hearing cassette player applications. The problems introduced result in interrupted recordings, difficulties in recording the final word of a message exactly and increasing the tape rewinding time. Based on past working experience in the cassette tape player industry, the inventor has spent many years as well as his great effort to complete this improvement of tape recorder mechanism, which provides simultaneous stopping of the recording tape drive and the magnetic head operation when the stop operation lever is depressed. This invention provides its user the perfect listing enjoyment that can be considered a big contribution in the cassette tape player industry.

SUMMARY OF THE INVENTION

This invention relates to the improvement of tape recorder stop mechanisms. The particular feature of this invention is the simultaneous stopping of recorder tape and the magnetic head operation when the stop operation lever is depressed. As the stop operation lever continues to be depressed further to its second step, the magnetic head operation lever is tripped out, which may stop the operation of the whole system. With this invention, high reliability and a precise tape stop position are obtained. The trouble caused by an interrupted tape recording during continuous operation is eliminated.

Conventionally, the recorded message on the tape is retrieved by means of the magnetic head touching the tape surface. When the stop operation lever is pressed down the magnetic head should be removed from tape surface and the retrieval of recorded sound should be stoped immediately.

According to the above mentioned descriptions, before the magnetic head operation lever is depressed, ie., before the the pinch roller gets in touch with the main guide shaft, the intermediate gear is not engaged with tape winding gear and the gears on transmission mechanism. However, the driving motor is already turned on so as to get a early motor start to reach the required running speed. When magnetic head touches the tape surface, the intermediate gear engages with winding gear and the gear on transmission mechanism simultaniously, and the pinch roller can be brought into contact with the main guide shaft immediately. At the correct driving speed the tape will be in forward play mode.

The forward play mode is formed by engagement of intermediate gear, the gear on transmission mechanism and winding gear, through which tape is driven. When the intermediate gear is disengaged from the other gear and pinch roller is removed from main guide shaft, tape movement is immediately stopped. However, the aforementioned condition has occurred after the magnetic head is removed from the tape surface, therefore, before the tape is completely stopped a short piece of tape is driven continuously forward which cause over-recording or changes the erasing position during the rewinding mode. When this tape continues its operation, there will be an interruption, discontinuities or problems stopping at the final point of a recording.

DETAILED DESCRIPTION OF THE INVENTION

Figure 1:
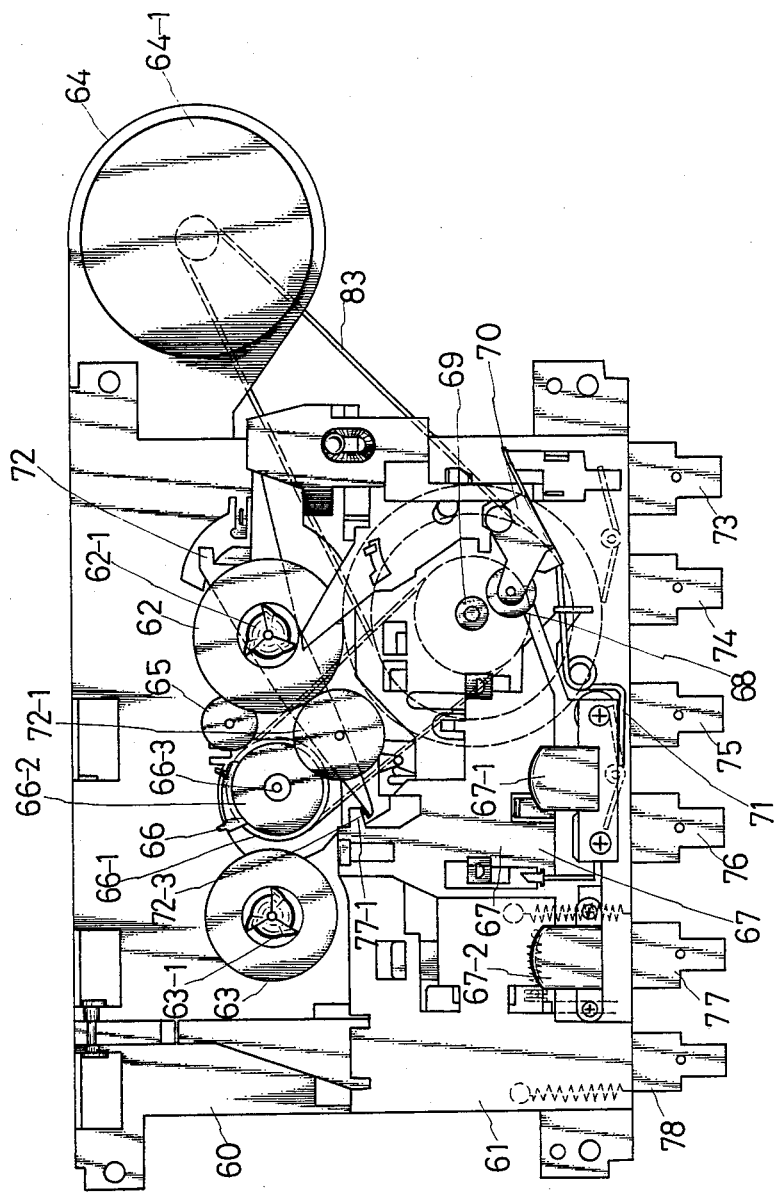
FIG. 1 is the assembly drawing of the invention.
Figure 2:
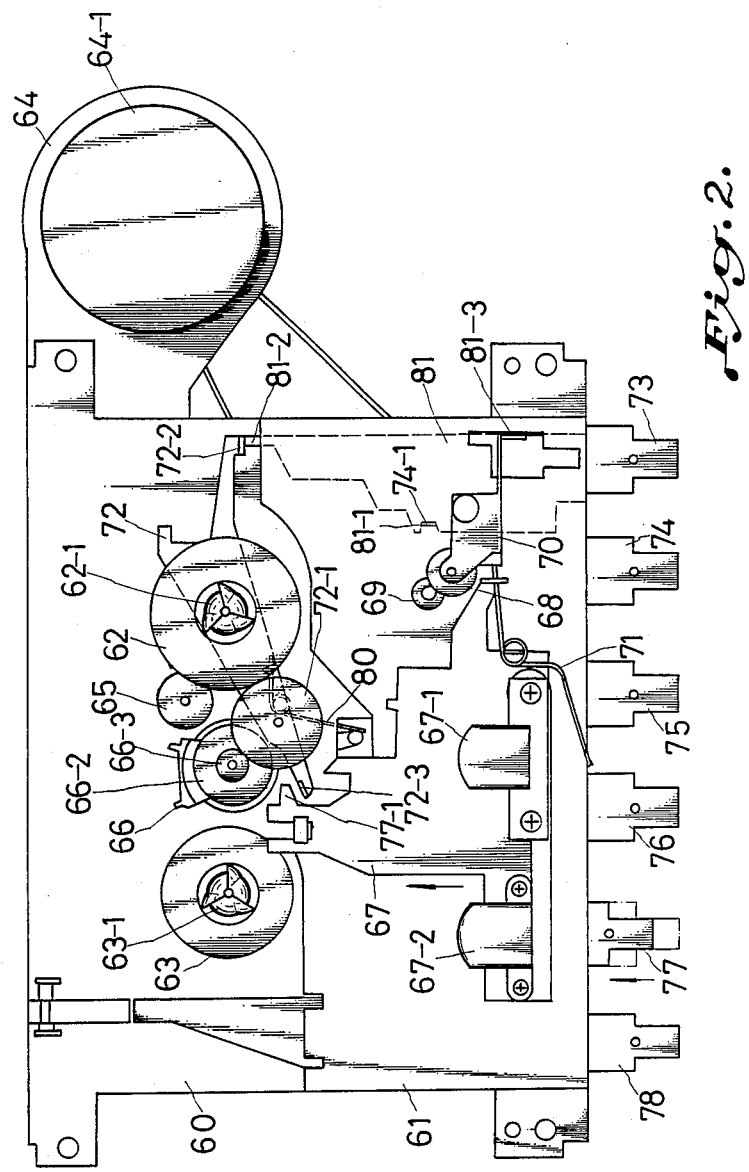
FIG. 2 is the operation drawing of the invention.

As shown in FIG. 1, on main deck (60) there are located secondary deck made by synthetic resin board (61), tape winding gear (62), unwinding gear (63), motor bracket (64) gear (65), transmission mechanism (66), a magnetic head base plate (67). Located at the secondary deck (61) is pinch roller (68), main guide shaft (69), a split spring (71) connecting secondary deck (61) to magnetic head base plate (67), and pinch roller (70). A magnetic head (67-1) is located on magnetic head base plate (67) along with a demagnetizer (67-2). A winding reel shaft (62-1) is connected to winding gear (62), an unwinding reel shaft (63-1) is connected to unwinding gear (63). A driving motor (64-1) is amounted on motor bracket (64), and coupled to a belt pulley (66-1) located under transmission mechanism (66) for driving a gear set located (66-2) above the transmission mechanism (66). A swivel arm (72) is located below winding gear (62). A winding intermidiate gear (72-1) and a push-back angle plate (72-2), shown in FIG. 2, are attached to swivel arm (72). The system further includes a pause operation lever (73) extending between main deck (60) and secondary deck (61), a stop operation lever (74), a fast forward operation lever (75), a rewind operation lever (76), magnetic operation lever (77), a record operation lever (78), the proper function being selected for forward and rewind operations. Beside these, a split spring (80) is applied to connect the swivel arm (72) and transmission mechanism (66) which provides return force for the forward-release operation. Also below the stop operation lever (74) there is located a knock-back slider (81), and the angle plate (74-1) located on stop operation lever (74) is engaged into the "U" shaped notch (81-1) of knock-back slider (81) which can interlock the movement of both parts.

Figure 3:
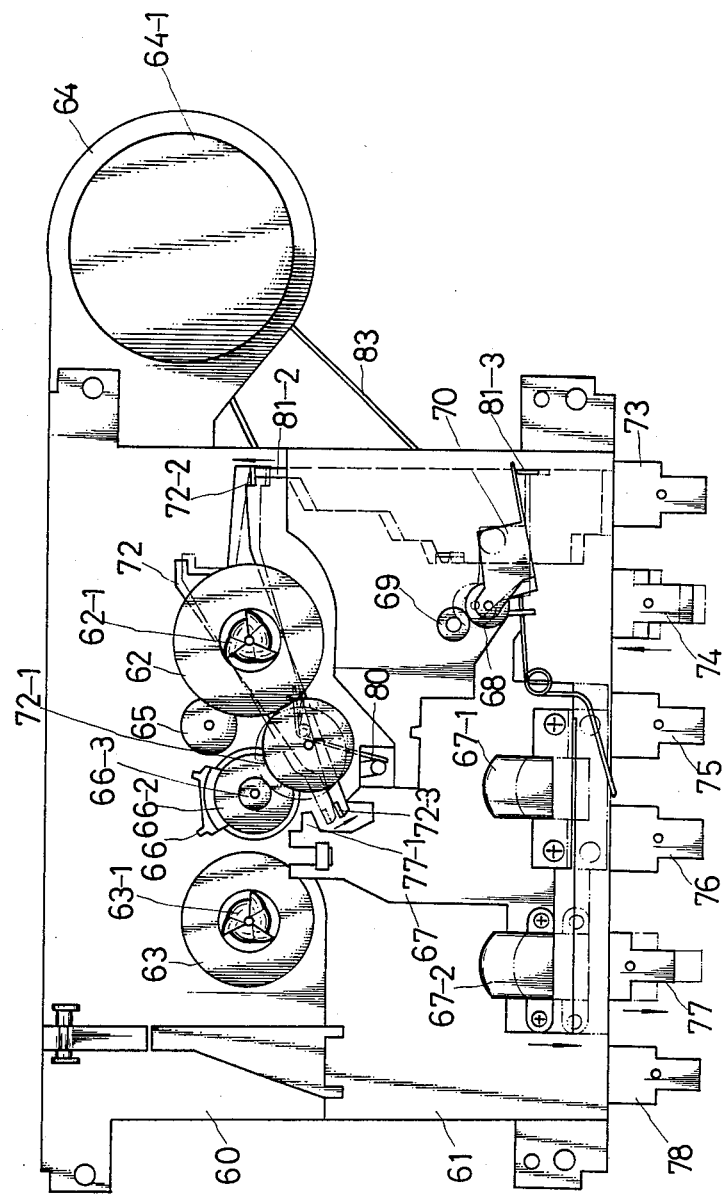
FIG. 3 is the operation drawing of the invention.

With reference to the mechanism shown in FIGS. 2, 3. When depressed, the magnetic head operation lever (77) (follow the direction of the arrow head shown in FIG. 2), the magnetic base plate (67) is allowed to drive magnetic head (67-1) in a forward direction to be brought into contact with tape surface (tape is already loaded on the mechanism but not shown in drawings), meanwhile the driving motor is already switched on. Subsequent to reaching the required R.P.M., and the magnetic head operation lever (77) being fully depressed, the magnetic head (67-1) is allowed to touch the tape surface. At the same time, the angle plate (72-3) on swivel arm (72) is released from the drawnback position (77-1) on magnetic head base plate (67). The force exected by the split spring (80) pushes the swivel arm and causes it to rotate about the center of winding gear shaft (62-1), which allows the intermediate gear (72-1) on swivel arm to move forward to engage the pinion gear (66-3) of the gear assembly (66-2). Also pinch roller (68) touches main guide shaft (69) and is in driving contact therewith. Thus pinch roller (68) and winding gear shaft (62-1) can be used to drive and wind the tape. This operation also allows the magnetic head to contact the tape surface to form the forward or reverse play mode. Also the forward recording mode enabled by the record operation lever (78) is achieved by a process as similar to the process stated above.

As previously stated, a push force is applied to swivel arm (72) by split spring (80), which forces the swivel arm rotating about the center of winding gear shaft (62-1) in clockwise direction. Which in turn brings the winding intermediate gear (72-1) to engage the pinion gear (66-3), when the driving motor (64-1) drives the pulley (66-1) by belt (83), which allows the winding reel shaft (62-1) to wind the tape. When a reverse force is applied on the swivel arm (72), it may rotate about the center of winding gear shaft in a counter clockwise direction to disengage the winding intermediate gear (72-1) from its meshing relationship gear, ie., to terminate the rotating motion of winding gear shaft (62-1). In order to separate the magnetic head (67-1) from the tape surface to terminate the play mode or erasing mode instantaneously, a knock-back slider (81) is applied between the lower side of the stop operation lever (74) and main deck (60), also a "U" shaped notch is made on the knock-back slider, which is designed to snap the angle plate (74-1) located on stop operation lever (74). Located at the end portion of knock-back slider (81) is a knock-back edge (81-2), and a knock-back angle plate (81-3) is also formed on knock-back slider (81), these elements allow a first step increment by slight depression of the stop operation lever, ie, the angle plate (74-1) carrys "U" shaped notch (81-1) moving knock-back slider (81). The knock-back angle plate (81-3) and knock-back edge (81-2) on knock-back slider (81) touches and presses the pinch roller bracket (70) and push-back angle plate (72-2) separately. The pinch roller (68) is released from main guide shaft (69) to turn the swivel arm (72) in a counter clockwise direction, the intermediate gear (72-1) is brought away from pinion gear (66-3), the tape is therefore stopped immediately. When stop operation lever (74) continues to its second step by depression of the lever, the forward mode of magnetic head operation lever (77) is released.

As concluded from above mentioned system, when the stop operation lever (74) is operated at its first step by slight depression of the stop operation lever (74), the effect is similar to that of the pause operation lever (73), ie, when tape is restarted in the play or record mode, an interruption will not occur, and that is to say, the restarting point on tape is exactly the same as the final position at which the tape stopped previously. From this description, it is realized, that when stop operation lever (74) is depressed the tape motion is also stopped simultaneously with removal of the magnetic head from the tape surface, this advantage is particulary valuable for use in a telephone answering system or language learning system, even under repeat forward-backward, stop, fast forward operation the message can be recorded completely. It is not only a good design but also an improvement of tape recorder systems, which make commercial availability economically feasible and can be referred to as a big contribution to the tape recorder art.

I claim:

1. An improvement of a tape recorder-player stop mechanism having a stop operation lever for stopping the transport of a magnetic tape which comprises:

a swivel arm, located about the pivot of a winding gear of a transmission mechanism, a split spring being connected to said swivel arm and transmission mechanism, said swivel arm being coupled to a winding intermediate gear and a push-back angle plate, said swivel arm having a middle portion positionally located below a winding reel shaft center;

a knock-back slider having a "U" shaped notch formed therein, said knock-back slider having a knock-back angle plate located on one end thereof and a knock-back edge located on an opposing end to provide a two step operation of said stop operation lever;

an angle plate located on said stop operation lever engaged within said "U" shaped notch of said knock-back slider when either a magnetic head operation lever or a record operation lever is operably engaged; said transport of said magnetic tape being substantially instantaneously stopped by partially depressing said stop operation lever to a first of said two step operation, said partial depression of said stop operation lever causing said knock-back slider to engage said swivel arm, said swivel arm rotates about the center of said winding reel shaft in a counter clockwise direction responsive to said engagement with said knock-back slider, said winding intermediate gear thereby being disengaged from said transmission mechanism while substantially simultaneously said knock-back angle plate causes disengagement of a pinch roller for stopping said transport of said tape, said rotation of said swivel arm also causing a magnetic head to be displaced from prior contact with said tape, the depressing of said stop operation lever to a second step of said two step operation by continued depressing of said stop operation lever results in removal of power from an electric motor coupled to said transmission mechanism.

* * * * *